(12) United States Patent
Hong et al.

(10) Patent No.: US 11,902,547 B2
(45) Date of Patent: Feb. 13, 2024

(54) LOW-DELAY TWO-PASS FRAME-LEVEL RATE CONTROL USING AN ADJUSTED COMPLEXITY

(71) Applicant: GOOGLE LLC, Mountain View, CA (US)

(72) Inventors: Danny Hong, New York, NY (US); Ramachandra Tahasildar, Cupertino, CA (US); Alex Sukhanov, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/376,423

(22) Filed: Jul. 15, 2021

(65) Prior Publication Data

US 2023/0013997 A1    Jan. 19, 2023

(51) Int. Cl.
| | |
|---|---|
| *H04N 19/194* | (2014.01) |
| *H04N 19/124* | (2014.01) |
| *H04N 19/172* | (2014.01) |
| *H04N 19/14* | (2014.01) |
| *H04N 19/154* | (2014.01) |

(52) U.S. Cl.
CPC ......... *H04N 19/194* (2014.11); *H04N 19/124* (2014.11); *H04N 19/14* (2014.11); *H04N 19/154* (2014.11); *H04N 19/172* (2014.11)

(58) Field of Classification Search
CPC .... H04N 19/194; H04N 19/124; H04N 19/14; H04N 19/154; H04N 19/172
See application file for complete search history.

(56) References Cited

U.S. PATENT DOCUMENTS

| | | | |
|---|---|---|---|
| 8,331,438 B2 * | 12/2012 | Chang ................. | H04N 19/159 |
| | | | 375/240.03 |
| 9,615,098 B1 * | 4/2017 | Yi .......................... | H04N 19/14 |
| 11,368,692 B2 * | 6/2022 | Qiu ...................... | H04N 19/172 |
| 2007/0081590 A1 * | 4/2007 | Goh .................... | H04N 19/149 |
| | | | 375/240.03 |

(Continued)

FOREIGN PATENT DOCUMENTS

WO    2014/114109 A1    9/2013

OTHER PUBLICATIONS

Chiang et al. 'A New Rate Control Scheme Using Quadratic Rate Distortion Model', IEEE Transactions on Circuits and Systems for Video Technology, vol. 7, No. 1, Feb. 1997, pp. 5.

(Continued)

*Primary Examiner* — Richard T Torrente (57) ABSTRACT

A two-pass encoding operation is implemented to encode one or more gaming frames into a game stream. The two-pass encoding operation includes a first encoding pass performed on a current frame. As a result of the first encoding pass, an estimated complexity for the current frame is determined. The resulting estimated complexity is then modulated according to a quality difference between reference frames used during the first pass encoding and a subsequent second pass encoding. Based on the modulated complexity, a quantization parameter is determined for the current frame that is then used to perform a second pass encoding on the current frame, resulting in an encoded frame. This encoded frame is then transmitted as part of a stream to a client system.

20 Claims, 4 Drawing Sheets

(56) References Cited

U.S. PATENT DOCUMENTS

| | | |
|---|---|---|
| 2008/0043847 A1 | 2/2008 | Haskell et al. |
| 2009/0074080 A1 | 3/2009 | He et al. |
| 2014/0241421 A1 | 8/2014 | Orton-Jay et al. |
| 2018/0324443 A1* | 11/2018 | Kudana ................ H04N 19/11 |
| 2020/0137389 A1* | 4/2020 | Qiu ...................... H04N 19/172 |
| 2021/0067785 A1* | 3/2021 | Zhang ................ H04N 19/159 |

OTHER PUBLICATIONS

Lee et al. 'Scalable Rate Control for MPEG-4 Video', IEEE Transactions on Circuits and Systems for Video Technology, vol. 10, No. 6, Sep. 2000, pp. 17.

H.264', Telecommunication Standardization Sector of ITU, Jun. 2019, pp. 836.

Grange et al. 'VP9 Bitstream & Decoding Process Specification—v0.6', Google, Inc., Mar. 31, 2016, pp. 171.

* cited by examiner

LOW-DELAY TWO-PASS FRAME-LEVEL RATE CONTROL USING AN ADJUSTED COMPLEXITY

BACKGROUND

Cloud-based gaming platforms involve executing portions of or entire video game applications on remote servers to facilitate playing the video game application on a local client device. The remote servers provide audio and video rendered from executing video game applications as audio and video streams over a network to the local client device. In providing these audio and video streams, the remote servers employ the use of various encoder operations to compress gaming frames and audio in real time before they are streamed. For low-latency cloud gaming applications, it is desirable to ensure that the encoder operations do not compress a gaming frame at a number of bits that will cause the stream to need more bandwidth than the available network allows.

Unlike general video streaming applications where some delay is tolerated, cloud-based gaming requires that real-time interactivity be maintained. To address this, some cloud-based gaming platforms call for every frame to be encoded very close to a target frame size that matches the currently available network bandwidth. Encoding the frame at a size other than the target frame size can result in either undershooting (resulting in less bits than allowed) or overshooting (resulting in more bits than allowed), with overshooting potentially leading to packet losses and delays that degrade the gaming experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Techniques and systems described herein address the demands of providing a low-latency video stream from one or more servers to a client system while maintaining video quality. In particular, such techniques and systems described herein allow for encoding frames at a server using a two-pass encoding operation that modulates, or adjusts, complexity estimates determined during a first pass encoding. To better ensure that the resulting bitstream is close to a target bitrate, a quantization parameter for each frame is determined based upon an estimated complexity determined during a first pass encoding. To limit frames being assigned more bits than allowed (i.e., an overshoot), the estimated complexity for each frame is modulated, or adjusted, according to a quality difference between reference frames used in the two-pass encoding operation. In this way, each frame is more accurately allocated the number of bits needed, lessening the risk that the resulting stream will be larger than a network's bandwidth will allow and minimizing packet loss over the network.

To facilitate understanding, the techniques of the present disclosure are described in the example context of a cloud gaming system. A cloud-based or other remote server renders a stream of video frames representing the visual content of a video game instance being executed at that server or a related server, and then encodes each frame using a two-pass encoding process described herein to generate a bit stream representing a stream of encoded rendered game frames for transmission to one or more client systems via one or more networks. However, it will be appreciated that the systems and techniques described herein are not limited to this example context, but instead may be implemented in any of a variety of video stream encoding/decoding systems using the guidelines provided herein.

Figure 1:
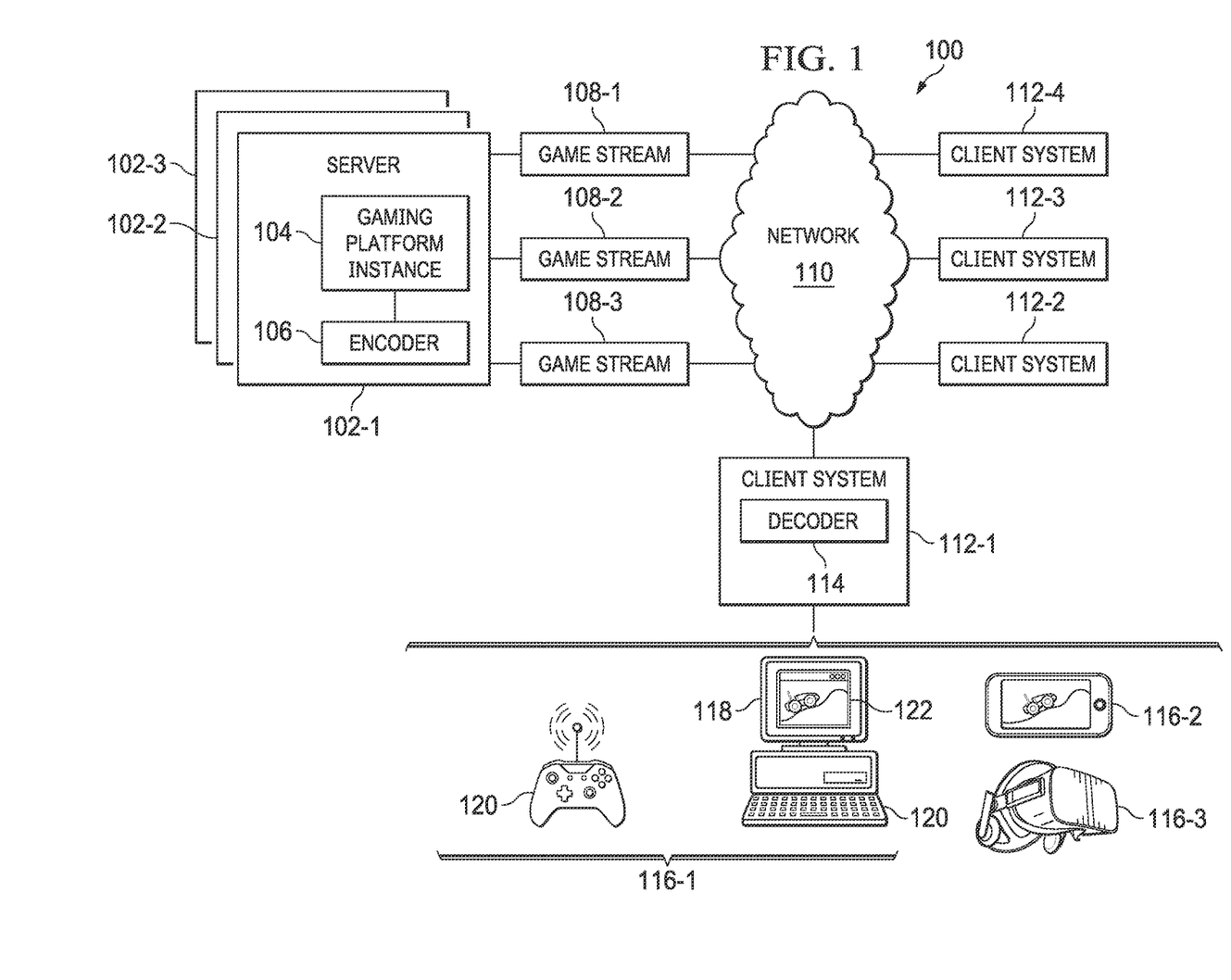
FIG. 1 is a block diagram of a cloud-based gaming system employing an adjusted-complexity two-pass frame rate control encoding technique, in accordance with some embodiments.

FIG. 1 illustrates a cloud-based gaming system 100 for single-player or multiplayer (including massively multi-player) gaming, according to some embodiments. Cloud-based gaming system 100 includes one or more servers 102, with each server 102 communicatively coupled to one or more client systems 112 by at least one network 110. Network 110 is configured to allow for the transmission and reception of data between any of servers 102 and client systems 112 and includes, for example, wired and wireless networks, such as Ethernet, the Internet, Wi-Fi, or any combination thereof. In embodiments, each server 102 is communicatively interconnected via a high-bandwidth, low-latency inter-server messaging bus. Servers 102 are typically distributed in one or more data centers over a geographical area so as to reduce transmission latency through physical proximity. Though in the illustrated embodiment, three servers 102-1, 102-2, and 102-3 are presented supporting four client systems 112-1, 112-2, 112-3, and 112-4, in other embodiments, any number of severs may be implemented supporting any number of client systems. It will be appreciated that in a typical real-world implementation, the quantity of servers 102 and quantity of client systems 112 typically will be considerably higher than presented in the example of FIG. 1.

In the depicted embodiment, each server 102 includes a computing device such as, for example, a cloud server, virtual server, or any combination thereof configured to support one or more client gaming sessions executed on one or more client systems 112. A "client gaming session", as used herein, includes a gaming application being played, partially simulated, or fully simulated on client system 112. Each server 102 is configured to support this client gaming session by executing a corresponding game platform instance 104 that facilitates the execution of at least a portion of the gaming application being played, partially simulated, or fully simulated on the client system 112. Such facilitation can include performing one or more operations related to the gaming application, such as, for example, rendering one or more frames related to the gaming application, performing calculations related to the gaming application (e.g., lighting calculations, artificial intelligence calculation, physics calculations, shading calculations, input calculations, and the like), providing access to files, or any combination thereof, to name a few. The game platform instance 104 provides various software and hardware resources to achieve such facilitation, such as communication/network management, resource management, media rendering encoding, and the like. In this way, game platform instance 104 simulates execution of one or more operations of gaming application for a corresponding player as though that gaming application was being played on a local gaming device, such as a personal computer ("PC"), game console, smart phone, tablet computer, automotive entertainment system, and the like.

Each client system 112 represents the hardware and software resources utilized to receive player input through manipulation of one or more input/output devices for at least one player, as well as to present the video and audio content representing the visual and auditory content, respectively, of the gameplay for the at least one player. Examples of a client system 112 include one or more desktop computers, notebook computers, tablet computers, virtual-reality systems, augmented reality systems, a compute-enabled cellular phone (i.e., a "smart phone"), a compute-enabled television (i.e., a "smart TV"), or any combination thereof, to name a few. As illustrated with reference to client system 112-1, each client system 112 includes one or more client devices 116. In the illustrated embodiment, client system 112-1 comprises a first client device 116-1, which is communicatively coupled to, or otherwise associated with, display 118, at least one input device 120 (e.g. a gamepad, joystick, keyboard, mouse, touchscreen), one or more network interfaces configured to couple to the network connecting the client system 112 to a corresponding server 102, one or more processors, memory, storage, speakers, and other computing resources to render, process, and display scenes of a virtual environment. As illustrated with reference to client system 112-1, each client system 112 can include a decoder 114 configured to decode one or more frames related to a virtual environment. Decoder 114 can include hardware and software configured to decode one or more encoding streams (e.g., game streams 108) received from servers 102 so as to produce a decoded set of frames or decoded stream. In embodiments, client system 112-1 further comprises a smart phone client device 116-2, and a wearable virtual reality client device 116-3, each of which may operate as an integrated mobile computing device having input facilities, output facilities, display facilities, and communication facilities analogous to those noted above with respect to client device 116-1. In certain embodiments, client devices 116-1, 116-2, and 116-3 may include one or more facilities such as accelerometers, Global Positioning System (GPS) devices, and the like that are used to acquire motion data representing movement of the client device, as well as a rate or acceleration of such movement.

While certain aspects described herein will be discussed with specific reference to cloud gaming scenarios, it will be appreciated that in certain embodiments the described techniques may be utilized in various non-gaming scenarios, such as if one or more of servers 102 and client systems 112 operate to render, process, and display other types of informational, educational, recreational and/or artistic content. It will therefore be further appreciated that while techniques are discussed herein with respect to the rendering of content that may utilize particular examples relevant to cloud gaming and gaming content, such discussions and techniques may be applied to such non-gaming scenarios. Examples provided herein may refer to scenarios involving the rendering, processing, and display of gaming content due to particular bandwidth and network latency issues relevant to such content and should not be construed to indicate that the techniques described are limited to those scenarios.

During operation, each server 102 executes a gaming platform instance 104 for one or more client gaming sessions. Executing game platform instance 104 includes rendering a set of frames that includes one or more gaming frames associated with the gaming application being executed on one or more respective client systems 112. Each rendered gaming frame depicts at least a portion of a virtual environment used in the gaming application executed on the client system 112. For example, each rendered gaming frame can depict at least a portion of a virtual environment displayed on a display 118 of a client device 116 during the client gaming session.

Each server 102 is configured to encode each rendered gaming frame via encoder 106 so as to generate a respective encoded set of frames (also referred to herein as "game stream" 108). Each server 102 is configured to encode a game stream 108 through, for example, compression, reorganization, and manipulation of each frame rendered by gaming platform instance 104. In embodiments, each encoder 106 of a server 102 implements one or more codecs so as to encode one or more rendered frames according to the one of more codecs. Such codecs can include H.264, H.265, VP9, AV1, or any combination thereof, to name a few. According to embodiments, each server 102 is configured to encode each frame rendered by gaming platform instance 104 using an adjusted-complexity two-pass encoding. As discussed in detail below with reference to FIG. 3, the adjusted-complexity two-pass encoding includes performing a first pass encoding on a frame to estimate a complexity, modulating the estimated complexity, and performing a second, subsequent encoding pass on the frame according to the modulated complexity. Each resulting game stream 108 corresponds to a gaming application being executed on one or more client systems 112 and is provided to these corresponding client systems via network 110. The corresponding client systems 112 are each configured to decode a received game stream 108 via a decoder 114 and display the resulting decoded set of frames 122 on, for example, a display 118. Each client system 112 is configured to decode a respective game stream 108 by compression, reorganization, and manipulation of the frames within the encoded stream according to one or more various video codecs including lossless and lossy codecs. According to embodiments, each client system 112 includes a decoder that implements one or more codecs so as to decode a received game stream 108 according to the one of more codecs. Such codecs can include H.264, H.265, VP9, AV1, or any combination thereof, to name a few. Though three game streams 108-1, 108-2, 108-3 are depicted in the illustrated embodiment, in other embodiments, servers 102 can generate any number of game streams 108 each corresponding to one or more client gaming sessions.

Figure 2:
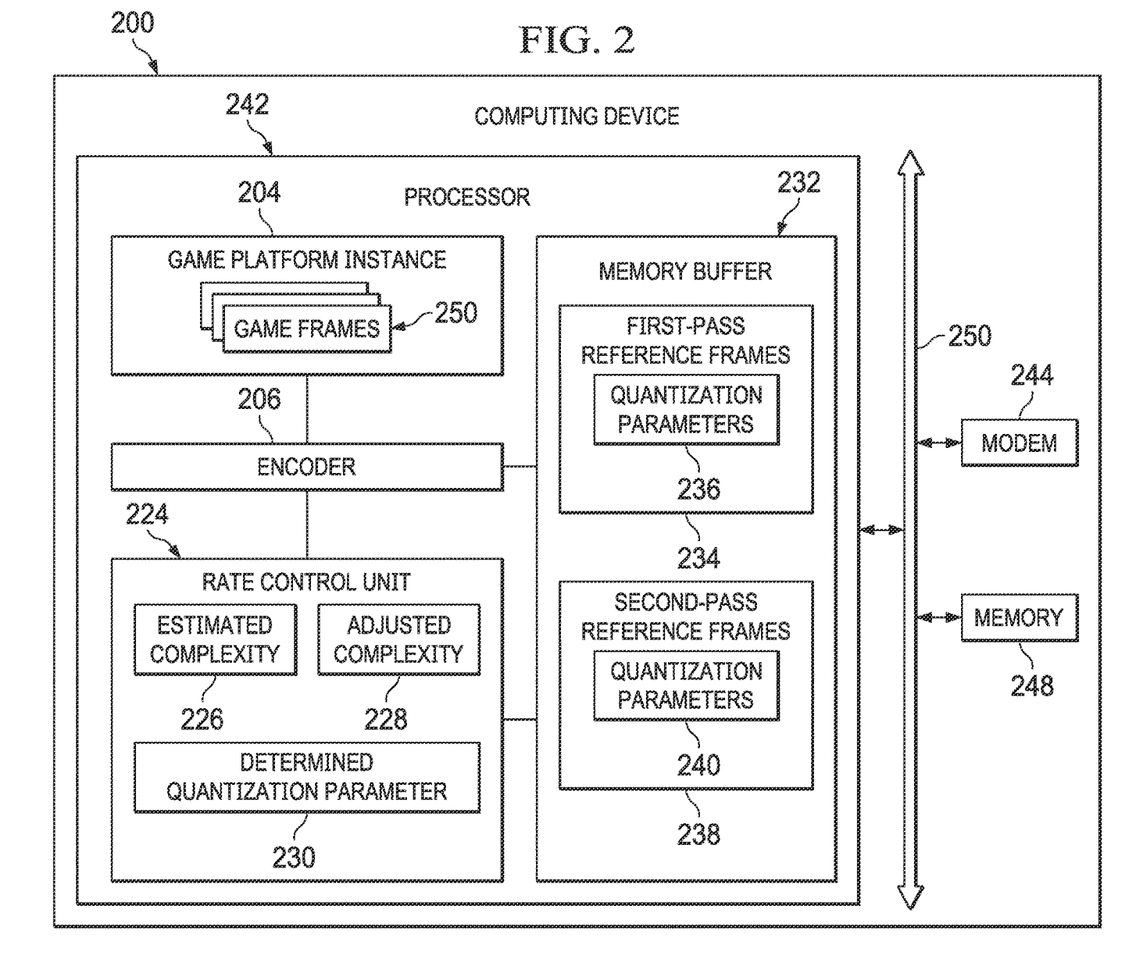
FIG. 2 is a block diagram of a computing device configured to encode and stream frames within a cloud-based gaming system, in accordance with some embodiments.

Referring now to FIG. 2, a computing device 200 configured to encode and stream frames within a cloud-based gaming system is illustrated. In embodiments, computing device 200 implements aspects of cloud-based gaming system 100 as described in FIG. 1. For example, computing device 200 may be similar or the same as a server 102 described in FIG. 1. Computing device 200 includes one or more software and hardware components for bi-directional communications including components for encoding a set of game frames 250 such as to produce a game stream 108. In some embodiments, computing device 200 is part of an electronic device that supports encoding of a set game frames 250, including, for example, a desktop computer, a notebook computer, a tablet, a server, a game console, to name a few. In embodiments, computing device 200 includes processor 242, modem 244, and memory 248. Memory 248 includes an electronic storage device, such as for example, a solid-state drive, a hard disk drive, random access memory ("RAM"), read-only memory ("ROM"), electronically erasable programmable ROM ("EEPROM"), optical storage device, or any combination thereof. Memory 248 includes instructions and data related to the operation of game platform instance 204, encoder 206, and rate control unit 224 such as, for example, codecs, reference frames, gaming engines, gaming applications, constants, and the like. Modem 244 is configured to be communicatively coupled to one or more client systems 112 via a network 110 and further configured to transmit a game stream 108 to the one or more client systems 112. According to embodiments, processor 242, modem 244, and memory 248 are internally in electronic communication via one or more interfaces (e.g., a bus 252).

According to embodiments, processor 242 includes one or more control processing units ("CPUs"), microprocessors, field-programmable gate arrays ("FPGAs"), graphics processing units ("GPUs"), application specific integrated circuits (ASICs), or any combination thereof and is configured to render and encode gaming frames for use in a client gaming session on cloud-based gaming system 100. Processor 242 operates to execute a game platform instance 204, the same or similar as game platform instance 104, associated with a current client gaming session and configured to support a gaming application executed on one or more client systems. Game platform instance 204 includes graphics hardware and software (not shown for clarity) to render a set of game frames 250 associated with an environment of the gaming application executed on the one or more client systems. Such graphics hardware and software include, for example, graphics cores, processing cores, pixel shaders, video random access memory (VRAM), GPUs, physics engines, lighting engines, tessellation engines, and the like. Each rendered game frame of the set of game frames 250 represents at least a portion of a virtual environment associated with the gaming application executed on the client system. For example, if the gaming application is a racing game, each game frame of the set of game frames 250 represents at least a portion of a racetrack, car, or surrounding area.

Each rendered game frame of the set of game frames 250 is provided to encoder 206 for encoding into a game stream 108. Encoder 206 includes one or more software and/or hardware encoders configured to encode game stream 108 according to, for example, interframe and intraframe techniques. To reduce the bandwidth needed to transmit a game stream 108 between computing device 200 and one or more client systems 112, encoder 206 encodes game stream 108 by compressing one or more game frames of the set of game frame 250. Compressing a game frame includes comparing the game frame to one or more reference frames stored in memory buffer 232 and encoding one or more of the differences between the game frame and the reference frames into game stream 108. Encoder 206 is further configured to encode the reference frames used into game stream 108. Further to reduce bandwidth, encoder 206 is configured to encode each frame according to a rate control scheme so that each encoded frame is compressed to be close in size to a predetermined target bit size. The rate control scheme is implemented by rate control unit 224 which includes one or more processors, hard-coded logic, programmable logic, or combination thereof, configured to control, or adjust, the bitrate and a number of respective bits (i.e., degree of compression) at which to encode a current frame of the set of game frames 250. Rate control unit 224 controls or adjusts the bitrate and the number of respective bits by determining an appropriate quantization parameter ("QP") for the current frame as a function of the complexity of the current frame. "Complexity", as used herein, refers to an amount or value of information in a current frame that differs from one or more reference frames associated with the current frame. In this way, the higher the complexity of the current frame, the more information within the frame the encoder 206 is required is to encode. As such, it is important that rate control unit 224 determines a QP high enough so as to help prevent the resulting encoded frame from having a number of bits larger than a predetermined target size related to the target bitrate. A person of ordinary skill in the art will appreciate that a QP determined in this way causes more aggressive quantization of details for a current frame with a high complexity, resulting in an encoded frame with a reduced number of encoded bits. Similarly, for a current frame with a low complexity, encoder 206 has less new information to encode, and thus a QP can be chosen for less aggressive quantization while still reducing the risk of a potential overshoot. In embodiments, rate control unit 224 determines a QP for a current frame according to the equation:

$$t=(a_1/QP+a_2/QP^2)*c \qquad [EQ1]$$

wherein t represents a predetermined, desired frame size, or degree of compression, for an encoded frame, $a_1$ and $a_2$ represent predetermined constants derived from past encoded frames' data, and c represents a complexity, or distortion, of the current frame.

According to embodiments, encoder 206 determines a complexity for a current frame by performing a two-pass encoding operation. The two-pass encoding operation includes performing a first pass encoding of a current frame of the set of game frames 250 using one or more first-pass reference frames 234 stored in memory buffer 232. In embodiments, the first pass encoding is performed by first downsampling the current frame, such as by lowering the resolution of the current frame in order to reduce encoding latency. According to embodiments, the first pass encoding is performed according to a predetermined first-pass QP determined from one or more codecs implemented by encoder 206. In embodiments, performing the first pass encoding on the current frame results in an encoded first-pass frame having a bit size. After the first pass encoding, rate control unit 224 determines an estimated complexity 226 for the current frame as a function of the bit size of the encoded first-pass frame.

The two-pass encoding operation further includes a second pass encoding of the current frame using one or more second-pass reference frames 238 stored in memory buffer 232. In some embodiments, rate control unit 224 calculates a determined quantization parameter 230 for the current frame as a function of estimated complexity 226. This determined quantization parameter 230 is then used to control, or adjust, the bitrate and number of bits with which to encode the current frame during the second pass encoding. According to other embodiments, rate control unit 224 is configured to first modulate the estimated complexity 226 for the current frame based upon a quality difference between one or more first-pass reference frames 234 used by the first pass encoding on the current frame and one or more second-pass reference frames 238 used by the second pass encoding on the current frame. A "quality difference", as used herein, includes a relationship between a quantization parameter 236 associated with one or more first-pass reference frames 234 used in the first pass encoding (also referring to herein as a "first-pass quantization parameter") and a quantization parameter 240 associated with one or more second-pass reference frames 238 used by the second pass encoding (also referred to herein as a "second-pass quantization parameter"). In embodiments, a quantization parameter associated with a reference frame (i.e., the quantization parameter used to encode the reference frame into a stream) may be used to encode the reference frame into a stream, such as game stream 108. Modulating the estimated complexity 226 based upon the quality difference helps to eliminate allocating more bits than allowed (i.e., "overshooting" the number of bits beyond the available bandwidth) when encoding the current frame into a game stream 108. Such overshooting can result in using more bandwidth than physically available to transmit the encoded game stream 108. In embodiments, rate control unit 224 modulates the estimated complexity 226 so as to determine an adjusted complexity 228 according to the equation:

$$c'=c_1*s(q_2)/s(q_1) \qquad [\text{EQ2}]$$

wherein c' represents the adjusted complexity 228, $c_1$ represents the estimated complexity 226, $q_2$ represents a quantization parameter 240 associated with one or more second-pass reference frames 238 (i.e., a second-pass quantization parameter), $q_1$ represents a quantization parameter 236 associated with one or more first-pass reference frames 234 (i.e., a first-pass quantization parameter), and s(q) represents a function returning a quantization step-size corresponding to a quantization parameter q. In embodiments, s(q) is determined from the codec implemented by encoder 206. According to embodiments, rate control unit 224 is configured to generate a determined quantization parameter 230 for a current frame 208 as a function of the adjusted complexity 228. This quantization parameter 230 is then passed to encoder 206 which determines a corresponding quantization step-size. Encoder 206 uses this quantization step-size to control or adjust output bits when encoding the current frame 208.

Figure 3:
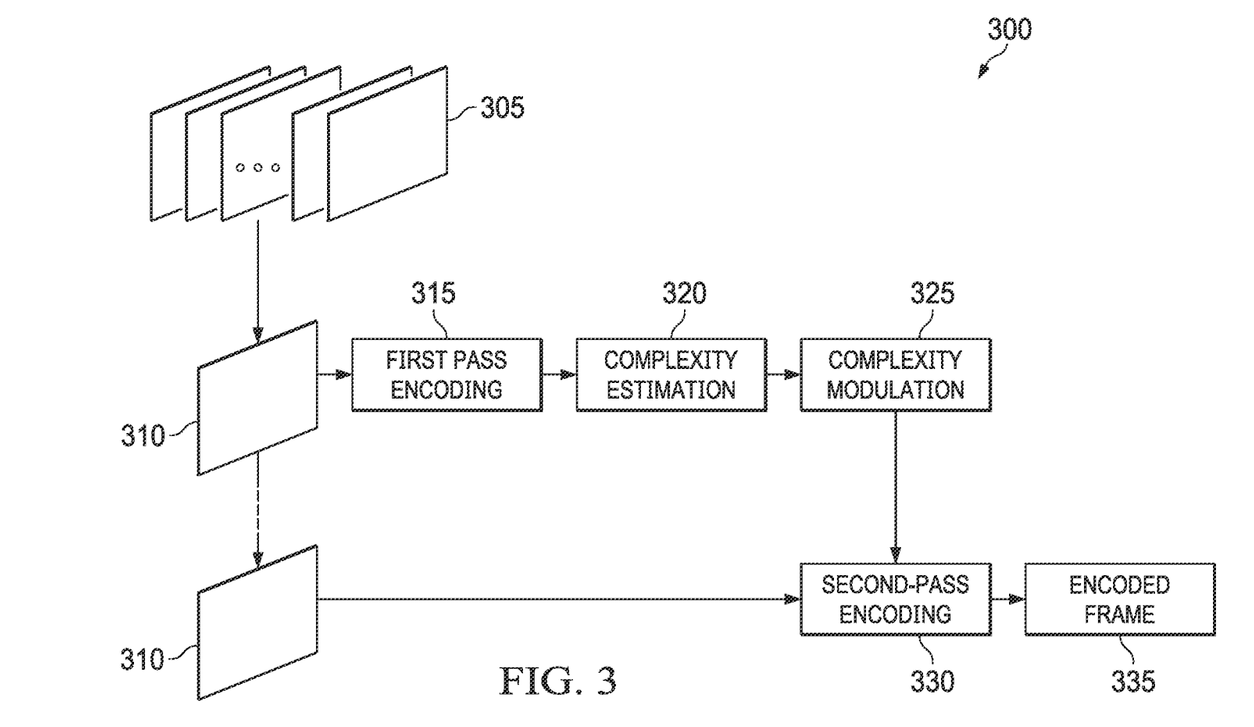
FIG. 3 is a flow diagram illustrating a method for a two-pass encoding of a frame of a set of frames, in accordance with some embodiments.

Referring now to FIG. 3, an example two-pass encoding operation 300 for an adjusted-complexity two-pass encoding technique is illustrated. For ease of illustration, the two-pass encoding operation 300 is described with reference to the computing device 200 of FIG. 2 implemented as a server 102 in the cloud gaming system 100 of FIG. 1. In operation 300, the game platform instance 204 renders a set of frames 305 for a client gaming session associated with a gaming application running on one or more client systems 112. Each frame of the set of frames 305 represents at least a portion of a virtual environment related to the gaming application. To facilitate transmission of the set of frames 305 to the client system executing the gaming application, encoder 206 encodes each frame of the set of frames 305 using a two-pass encoding operation based on an adjusted complexity. In doing so, the amount of bandwidth needed to transmit the encoded set of frames to the client system is more closely matched to the actual available bandwidth.

For a current frame (also referred to herein as a "first frame") 310 of the set of frames 305, encoder 206 performs a first pass encoding 315. According to some embodiments, the first pass encoding 315 includes, to reduce overall encoding latency, downsampling the current frame (i.e., first frame) 310, such as by lowering the resolution of the current frame 310. Encoder 206 encodes the current frame using one or more first-pass reference frames and a predetermined quantization parameter so as to result in a first pass encoded frame. After the first pass encoding 315, rate control unit 224 determines a complexity estimation 320 based upon the bit size of the first pass encoded frame. For example, rate control unit 224 determines the estimated complexity as a scaled factor version of the bit size of the first pass encoded frame.

After rate control unit 224 determines the estimated complexity of the current frame 310, rate control unit 224 performs a complexity modulation 325 so as to produce an adjusted complexity. The complexity modulation 325 includes modulating the estimated complexity determined from complexity estimation 320 according to a quality difference between one or more reference frames used in first pass encoding 315 (also referred to herein as a "first-pass reference frames") and one or more reference frames used in second pass encoding 330 (also referred to herein as a "second-pass reference frames"). In embodiments, the quality difference between the reference frames is represented as a ratio of an actual quantization step-size of one or more second-pass reference frames (also referred to herein as a "second-pass quantization step-size") to an actual quantization step-size of one or more first-pass reference frames (also referred to herein as a "first-pass quantization step-size"). For example, the quality difference is represented as $QS_2/QS_1$ wherein $QS_2$ represents the actual quantization step-size of one or more second-pass reference frames and $QS_1$ represents the actual quantization step-size of one or more first-pass reference frames. According to embodiments, the estimated complexity can be modulated according to the equation:

$$c'=c_1*QS_2/QS_1 \qquad [\text{EQ3}]$$

wherein c' represents the adjusted, or modulated, complexity, $c_1$ represents the estimated complexity from complexity estimation 320, $QS_2$ represents a quantization step-size of one or more second-pass reference frames, and $QS_1$ represents a quantization step-size of one or more first-pass reference frames. As such, modulating or adjusting the estimated complexity is determined as a function of the ratio of $QS_2$ to $QS_1$. When the ratio of $QS_2$ to $QS_1$ is greater than 1 (i.e., when $QS_2$ is greater than $QS_1$), the estimated complexity is increased to determine the adjusted complexity. Likewise, when the ratio of $QS_2$ to $QS_1$ less than 1 (i.e., when $QS_2$ is less than $QS_1$), the estimated complexity is decreased to determine the adjusted complexity. In embodiments, rate control unit 224 determines a quantization step-size for respective reference frames as a function of a quantization parameter associated with the reference frames and the codec implemented by the encoder. For example, rate control unit 224 may determine the quantization step-size from the quantization parameter used to encode the reference frames according to a function associated with the codec.

After rate control unit 224 determines the adjusted complexity from complexity modulation 325, encoder 206 performs a second pass encoding 330 of the current frame 310. Second pass encoding 330 includes determining a quantization parameter for the current frame 310 as a function of the adjusted complexity from complexity modulation 325. For example, rate control unit 224 determines the quantization parameter to be used by the second pass encoding as discussed above in EQ1, using the adjusted complexity from complexity modulation 325. Encoder 206 then performs second pass encoding 330 on the current frame 310 according to the second-pass reference frames and at the determined quantization parameter so as to produce encoded frame 335, with encoded frame 335 having a size close to a target size (e.g., t in EQ1). Encoding the current frame 310 using the quantization parameter determined from an adjusted complexity helps reduce the potential for encoded frame 335 to have a bit size greater than the target size.

Figure 4:
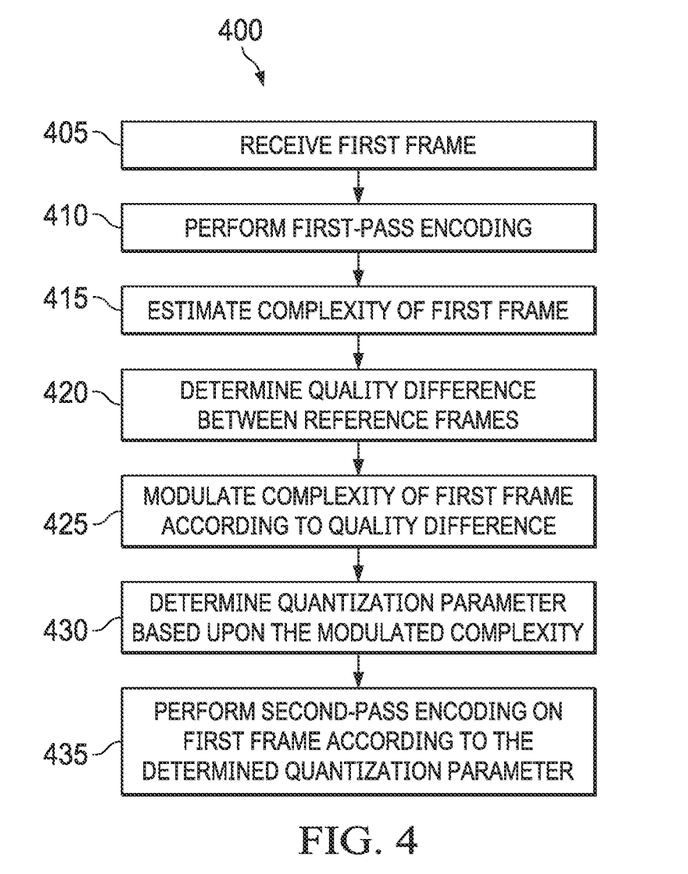
FIG. 4 is a flow diagram illustrating an example of a two-pass encoding process using an adjusted complexity, in accordance with some embodiments.

Referring now to FIG. 4, a method 400 for two-pass encoding using an adjusted complexity is illustrated. For ease of illustration, the method 400 is described with reference to the computing device 200 of FIG. 2 implemented as a server 102 of the system 100 of FIG. 1. At block 405, an encoder, the same or similar as the encoder 206, receives a current frame (i.e., a first frame). The current frame represents at least a portion of a virtual environment associated with a client gaming session. At block 410, the encoder performs a first pass encoding on the current frame. According to some embodiments, the first pass encoding includes downsampling the current frame, such as by decreasing its resolution, and encoding the current frame using one or more first-pass reference frames. The first pass encoding produces an encoded first pass frame that has a number of bits.

At block 415, rate control unit, the same or similar as rate control unit 224, determines a complexity of the current frame (i.e., first frame) based upon the number of bits in the encoded first pass frame. At block 420, the rate control unit determines a quality difference between one or more first-pass reference frames used at block 410 and one or more reference frames associated with a second pass encoding operation. For example, the rate control unit determines a quality difference between one or more first-pass reference frames and one or more second-pass reference frames associated with the second pass encoding operation. According to embodiments, the rate control unit determines the quality difference between the reference frames as a function of a ratio of a quantization step-size of the second-pass reference frames to the quantization step-size of the first-pass reference frames. At block 425, the rate control unit modulates the estimated complexity determined at block 415 according to the determined quality difference determined at block 420 so as to produce an adjusted complexity. For example, the rate control unit modulates the estimated complexity according to a ratio of a quantization-step size of the second-pass reference frames to the quantization step-size of the first-pass reference frames.

At block 430, the rate control unit determines a quantization parameter for the current frame according to the adjusted complexity. Determining the quantization parameter according to the adjusted complexity lowers the risk of using more bits to encode the current frame than is allowed. At block 435, the encoder performs a second pass encoding operation on the current frame using the second-pass reference frame and the determined quantization parameter.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The preposition "or" as used in the context of "at least one of A, B, or C", is herein used to signify an "inclusive or." That is to say, in the above and similar contexts, or is used to signify "at least one of or any combination thereof." For example, "at least one of A, B, and C" is used to signify "at least one of A, B, C, or any combination thereof."

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:
1. A computer-implemented method, comprising:
performing a first pass encoding of a two-pass encoding process on a first frame of a stream of frames using a first-pass reference frame;
determining a complexity of the first frame based upon the first pass encoding of the first frame;

adjusting the complexity of the first frame based on a quality difference between a second-pass reference frame to be used during a second pass encoding of the two-pass encoding process for the first frame and the first-pass reference frame so as to produce an adjusted complexity, wherein the second-pass reference frame is different from the first-pass reference frame; and performing the second pass encoding on the first frame using the second-pass reference frame and according to the adjusted complexity to generate an encoded frame.

2. The method of claim 1, wherein the second-pass reference frame is associated with a second-pass quantization parameter and the first-pass reference frame is associated with a first-pass quantization parameter.

3. The method of claim 2, wherein adjusting the complexity based on the quality difference further comprises:
adjusting the complexity as a function of the first-pass quantization parameter and the second-pass quantization parameter.

4. The method of claim 2, further comprising:
determining the quality difference, wherein determining the quality difference comprises:
determining a first-pass quantization step-size as a function of the first-pass quantization parameter; and
determining a second-pass quantization step-size as a function of the second-pass quantization parameter; and
wherein the quality difference comprises a ratio of the second-pass quantization step to the first-pass quantization step.

5. The method of claim 4, wherein adjusting the complexity based on the quality difference comprises:
in response to the second-pass quantization step-size being greater than the first-pass quantization step-size, increasing the complexity; and
in response to the second-pass quantization step-size being less than the first-pass quantization step-size, decreasing the complexity.

6. The method of claim 1, further comprising:
determining a quantization parameter for the first frame according to the adjusted complexity; and
wherein the second pass encoding is performed further according to the quantization parameter for the first frame.

7. The method of claim 1, further comprising:
encoding the stream of frames using iterations of the two-pass encoding process so as to produce an encoded stream; and
transmitting the encoded stream to a client system.

8. The method of claim 7, further comprising decoding the encoded stream at the client system so as to produce a decoded stream of frames.

9. The method of claim 7, wherein the first frame comprises data representing at least a portion of a virtual environment related to a client gaming session.

10. The method of claim 9, further comprising:
rendering the first frame based on a gaming application associated with the client gaming session.

11. A system, comprising:
an encoder configured to:
perform a first pass encoding of a two-pass encoding process on a first frame of a stream of frames using a first-pass reference frame; and
perform a second pass encoding of the two-pass encoding process on the first frame using a second-pass reference frame and according to an adjusted complexity, wherein the second-pass reference frame is different from the first-pass reference frame; and
a rate control unit configured to:
determine a complexity of the first frame from the first pass encoding of the first frame; and
modulate the complexity of the first frame based on a quality difference between the second-pass reference frame and the first-pass reference frame so as to produce the adjusted complexity.

12. The system of claim 11, wherein the rate control unit is further configured to:
determine a size of an encoded frame resulting from the first pass encoding; and
determine the complexity of the first frame according to the size of the encoded frame resulting from the first pass encoding.

13. The system of claim 11, wherein the second-pass reference frame is associated with a second-pass quantization parameter and the first-pass reference frame is associated with a first-pass quantization parameter.

14. The system of claim 13, wherein the rate control unit is further configured to:
adjust the complexity as a function of the first-pass quantization parameter and the second-pass quantization parameter.

15. The system of claim 13, wherein the rate control unit is further configured to:
determine a first-pass quantization step-size based upon the first-pass quantization parameter;
determine a second-pass quantization step-size based upon the second-pass quantization parameter; and
wherein the quality difference comprises a ratio of the second-pass quantization step-size to the first-pass quantization step-size.

16. The system of claim 15, wherein the rate control unit is further configured to:
in response to the second-pass quantization step-size being greater than the first-pass quantization step-size, increase the complexity; and
in response to the second-pass quantization step-size being less than the first-pass quantization step-size, decrease the complexity.

17. The system of claim 11, wherein the encoder is further configured to perform the second pass encoding according to at least one codec.

18. The system of claim 17, wherein the rate control unit is further configured to:
determine the complexity based upon the at least one codec.

19. The system of claim 11, further comprising:
a client system configured to:
initiate a client gaming session;
receive the first frame as encoded by the second pass encoding; and
decode the first frame encoded by the second pass encoding.

20. The system of claim 19, wherein the system further comprises:
a game platform instance configured to render the stream of frames based on a gaming application associated with the client gaming session.

* * * * *